(12) United States Patent
Tie et al.

(10) Patent No.: US 8,602,178 B2
(45) Date of Patent: Dec. 10, 2013

(54) CONSTANT STRAIN SPRING COMPENSATION DEVICE

(76) Inventors: Rongjun Tie, Yangzhou (CN); Liqun Wu, Yangzhou (CN); Rongkang Tie, Yangzhou (CN); Guanghong Tie, Yangzhou (CN); Chengchen Wu, Yangzhou (CN)

( * ) Notice: Subject to any disclaimer, the term of this patent is extended or adjusted under 35 U.S.C. 154(b) by 852 days.

(21) Appl. No.: 12/091,825

(22) PCT Filed: Jan. 23, 2007

(86) PCT No.: PCT/CN2007/000253
§ 371 (c)(1),
(2), (4) Date: Apr. 27, 2010

(87) PCT Pub. No.: WO2008/092296
PCT Pub. Date: Aug. 7, 2008

(65) Prior Publication Data
US 2010/0206678 A1    Aug. 19, 2010

(51) Int. Cl.
*B60T 8/72* (2006.01)
*F16D 63/00* (2006.01)

(52) U.S. Cl.
USPC ............................................. 188/180; 188/67

(58) Field of Classification Search
USPC .............. 188/67, 68, 180, 189, 265; 267/174, 267/175, 177, 178; 191/40, 41
See application file for complete search history.

(56) References Cited

U.S. PATENT DOCUMENTS

| 3,644,688 | A | * | 2/1972 | Tustin et al. | ..................... 191/40 |
| 5,380,961 | A | * | 1/1995 | Ronning et al. | ................ 191/41 |
| 2006/0049020 | A1 | * | 3/2006 | Xie | ............................. 192/66.2 |

FOREIGN PATENT DOCUMENTS

| CN | 1663839 | | 9/2005 |
| CN | 1693108 | | 11/2005 |
| CN | 1736763 | | 2/2006 |
| EP | 1106421 | A1 | 6/2001 |
| FR | 2597040 | A1 * | 10/1986 |
| JP | 7107632 | | 4/1995 |
| WO | WO-2004046576 | A1 * | 6/2004 |

* cited by examiner

*Primary Examiner* — Melody Burch
(74) *Attorney, Agent, or Firm* — Shook, Hardy & Bacon LLP (57) ABSTRACT

A constant strain spring compensation device, mainly comprising the grooved pulley, compensation cable, left end plate, spindle, oil seal, bearing, right end plate, contact flat spiral spring, housing, fastening angle steel, mounting base, pin, and wire-breaking arresting device. Said grooved pulley is fixed on the spindle, said compensation cable is wound and one of its ends is fixed on the grooved pulley, and the other end is connected to exterior overhead contact lines. Said spindle is supported on left end plate and right end plate by using the oil seal and bearing. Said left end plate, right end plate, housing, fastening angle steel, and mounting base form a closed box base. Said pin is connected to the side of the mounting base remote from said box base. Said contact flat spiral spring is arranged within said box base with the inner end hook being connected to the spindle and the outer end hook being connected to the fastening angle steel of the box base. The constant strain spring compensation device of the present invention is compact, small in size and weight. It may maintain a certain strain on the overhead contact lines of electrified railway to reduce the contact loss rate of its pantograph.

19 Claims, 5 Drawing Sheets

CONSTANT STRAIN SPRING COMPENSATION DEVICE

FIELD OF THE INVENTION

The present invention relates to the field of electrical power supply for overhead contact lines of an electrified railway, and particularly relates to a constant strain spring compensation device which can maintain a certain strain on overhead contact lines (catenary cables, contact cables and flexible catenary spans) of an electrified railway to reduce the contact loss rate of its pantograph.

BACKGROUND OF THE INVENTION

The overhead contact lines (catenary cables, contact cables and flexible catenary spans) of an electrified railway affect both the height and strain of the contact suspension due to the shrinkage or expansion caused by variation in temperature and because of the elongation of elastic linear material caused by creep, wear of cable, etc., as well as the tilting of the supports due to long time use. These factors cause contact loss, and deteriorate the current-collecting capability of overhead contact lines, whilst increased strain could cause the breakage of overhead contact lines, which leads to operation faults of the overhead contact lines.

Overhead contact lines are arranged in sections. Each of the sections is called an anchor section, and is installed at both ends. In order to automatically keep a constant strain of the overhead contact lines, normally, strain compensation devices are provided at anchor points.

Existing strain compensation devices that are currently in use have mainly the following two forms.

1. Existing compensation devices set up on existing overhead contact lines (catenary cables, contact cables and flexible catenary spans) of an electrified railway are usually of the weights type, two kinds of which, namely pulley block and ratchet wheel are normally utilized. These two kinds of compensation devices have the advantages of having simple structures and high reliability in operation. However, they have also the disadvantages of being large in size, heavy in weight, ugly in appearance, and easy to swing and get struck in a strong wind. Another disadvantage is that they are expensive in terms of installation and maintenance. This is mainly caused by the need of supplementary structures to support, conduct and protect such compensation devices and the daily operation management and repair work involved. Particularly while reconstructing electrical contact lines and installing the weight in low and narrow spaces of, for example, an underground railway and an existing tunnel etc., it is necessary to expand the cross sections of the tunnel. This will result in significantly increasing the project quantities, disturbing the traffic, prolonging project time, and increasing project expenses. In a place of more complicated geological conditions, it is even hardly to carry out the project.

2. The flexible catenary span of electrified overhead contact lines is the horizontal support device of overhead contact lines suspension in a railway station yard with multiple tracks, which consists of supports situated along both sides of railway, horizontal catenary cables suspended from the support, upper and lower positioning cables and accessories which hold and connect them.

In order to improve the current-collecting capability of overhead contact lines and decrease operation maintenance of flexible catenary span, a compensation device is provided on upper and lower parts of the positioning cable. The compensation device may be basically adapted to the steadiness of the height of flexible catenary span, however, it has the disadvantages of being short in compensation anchor section, big in strain changes, small in elongation length, poor in performance.

The following several kinds of compensation devices existing in China and other countries do not have wide application due to their various disadvantages.

1. Compensation devices consisting of several cylindrical helical compression springs in series (for example: the elastic strain compensation device of Chinese Patent No. 200420025333.1, overhead contact lines elastic strain automatic compensation device of Chinese Patent No. 200510038827.2): since the force of cylindrical helical compression spring adopted is directly proportional to the travel, such compensation device can not ensure the constancy of strain of the overhead contact lines.

2. Hydraulic or pneumatic type compensation devices (such as: a hydraulic compensation device for electrified railway of Chinese Patent No. 03235102.X, a differential plunger hydraulic strain compensation device of Chinese Patent No. 03218606.1, a pneumatic strain compensation device for electrified railway of Chinese Patent No. 0023267.2): due to the loss of oil or air, continuously monitoring and maintaining, and refilling oil or air are necessary. Since oil or air leaks occur frequently, their costs are higher and application thereof is restricted.

SUMMARY OF THE INVENTION

With the development of electrified railways for use in intercity transit, a special line for passenger transport and high-speed train, the train speed has been increased to 200 km/h, 300 km/h or even higher, which presented higher requirements for compensators of the overhead contact lines. How to ensure the safety, reliability thereof has become an urgent problem to be solved.

The constant strain spring compensation device is an important component of the overhead contact lines of electrified railway. It is an important device to maintain a constant strain of the overhead contact lines despite the variation of the temperature. The capability of the constant strain spring compensation device directly affects the suspension elasticity of the overhead contact lines and the standard status of the overhead contact lines in spatial position etc., which is greatly significant for reducing the faults of the pantograph and overhead contact lines and improving safety reliability of the overhead contact lines.

The object of the present invention is to provide a device automatically compensating the length change of the tightly extended overhead contact lines (catenary cables, contact cables and flexible catenary spans) of an electrified railway by elastic deformation energy, as endogenesis, stored by a pre-winded contact flat spiral spring to overcome the shortages of the various above-mentioned compensation devices that rely upon external energy. This entirely mechanical high performance device can ensure the strain of the overhead contact lines, be adjustable to the length change thereof, and maintain constant. The device according to the present invention has a compact structure, greatly reduced size and weight, and is thereby capable of improving the stability of the overhead contact lines suspension and enhancing the train speed.

The technical solution provided by the present invention to solve the above-mentioned technical problems includes: overhead contact lines (catenary cables, contact cables, and flexible catenary spans) are connected and functioning on the grooved pulley (involute grooved pulley, helical grooved pulley or fixed grooved pulley) by the compensation cable of the constant strain spring compensation device of overhead contact lines. When environment temperature changes, the length of the overhead contact lines changes because of heat expansion and cold contraction, the grooved pulley drives the contact flat spiral spring on the spindle. Thus pivoting moment is produced in the plane which is perpendicular to the spindle of the contact flat spiral spring, and the pre-winded contact flat spiral spring stores elastic deformation energy so that the moment produced by winding and releasing the contact flat spiral spring enable the elongation and shortening of the compensation cable. This arrangement ensures that a constant strain is maintained while the length of the overhead contact lines changes.

The present invention provides a constant strain spring compensation device, mainly comprising a grooved pulley, compensation cable, left end plate, spindle, oil seal, bearing, right end plate, contact flat spiral spring, housing, fastening angle steel, mounting base, pin, and wire-breaking arresting device.

The grooved pulley is fixed on the spindle, said compensation cable is wound and one of its ends is fixed on the grooved pulley, and the other end is connected to exterior overhead contact lines. The spindle is supported on left end plate and right end plate by using the oil seal and bearing.

The left end plate, right end plate, housing, fastening angle steel, and mounting base form a closed box base. The pin is connected to the side of the mounting base remote from said box base.

The contact flat spiral spring is arranged within said box base with the inner end hook being connected to the spindle and the outer end hook being connected to the fastening angle steel of the box base.

The wire-breaking arresting device is cooperatively assembled with the grooved pulley and the end plates, which may, in case of breakage of the overhead contact lines or the compensation cable, stop the grooved pulley to the stationary status by means of the friction, so that the contact flat spiral spring does not produce a relatively large rebound force, ensuring the safe operation of the constant strain spring compensation device.

The wire-breaking arresting device mainly includes the brake disc, wedge block, torsion spring, fastening bolt and nut, compression screw, compression spring, and steel ball, wherein the brake disc is fixed to the grooved pulley, the wedge block is fixed on the end plate by means of the bolt and nut, the torsion spring is assembled over the portion of the fastening bolt between the wedge block and the end plate, a groove may be formed on the outer peripheral surface of the brake disc for operatively fitting and functioning with the slit on the top of the wedge block, the compression device consisting of said compression screw, compression spring, and the steel ball are installed under the fastening bolt.

Since the strain compensation of the overhead contact lines of electrified railway is achieved by the tension effect of the compensation cable, the compensation cable is the vital force-applied component. Because the compensation cable is applied a great strain and works under a very rough environment, the phenomenon of broken strand or broken line due to tiredness and/or friction always occurs. A wire-breaking arresting device is arranged at the strain compensating location of the overhead contact lines terminal in order to provide such a device that the drawing force at the line outlet location thereof is opposite to direction of the pulling force of the energy stored device of the compensation device, so that the grooved pulley is stopped immediately once a line broken accident of overhead contact lines occurs, thereby achieving the object of reducing the serious results of the accident and protecting the compensation device.

The positioning surface of the spindle of the constant strain spring compensation device of the present invention is formed with spline slots coupled with the spline housing on the grooved pulley or on the sleeve of the grooved pulley. The feature of the cross section shape of said spline slots is flange type or groove type.

The contact flat spiral spring may be variable torque flat spiral spring or constant torque flat spiral spring formed by assembling upper and lower groups in parallel.

The contact flat spiral spring may be one or more than one formed by winding one or more layers of steel trips.

The grooved pulley may be an involute grooved pulley, helical grooved pulley, or fixed grooved pulley. Said constant torque flat spiral spring is coupled with said fixed grooved pulley or helical grooved pulley. Said variable torque flat spiral spring is coupled with said involute grooved pulley.

The end radius of said involute grooved pulley may be determined according to the following equation: End-radius=Start radius×(End torque of the flat spiral spring/Start torque of the flat spiral spring)

The equation is deducted as follows: on the assumption that:
End torque of variation torque flat spiral spring: $N_1$
Start torque of variation torque flat spiral spring: $N_2$
Start force of compensation cable: $F_1$
End force of compensation cable: $F_2$
Start radius of grooved pulley: $r_1$
End radius of grooved pulley: $r_2$
According to elastic characteristic $N_1 = F_1 \times r_1$, $N_2 = F_2 \times r_2$
i.e., $F_1 = N_1/r_1$, $F_2 = N_2/r_2$
To ensure constant load during output process, them $F_1 = F_2$
i.e., $N_1/r_1 = N_2/r_2$
It is obtained that: $r_2 = r_1 \times N_2/N_1$ The grooved pulley may be formed with a single groove or double grooves. It may be one installed on one end of the spindle of box base or on the spindle center, or may be two symmetrically installed on both ends of the spindle.

The wire-breaking arresting device may be one installed on the left end plate or on the right end plate, or may be two installed on left and right end plates respectively.

The shape of the connecting bevel surfaces between the brake disc and the wedge block of the wire-breaking arresting device include planes, arc surface, helicoids, spherical surfaces and other curved surfaces, and the combinations thereof. The angle between the tangent planes of any point on said bevel surface and the tangent line at that point through which the circumference with the axis of the revolution as the centre goes does not equal to zero.

The shape of the positioning surface of said spindle and grooved pulley may be triangle, quadrilateral, or polygon.

The spindle are supported by end plates of both sides of the box base. The support positioning manner may be at least two supports, and may be three supports or any number above.

The compensation cable may be steel cable or high performance polyethylene fiber rope.

The main technical specifications of the constant strain spring compensation device of the present invention are:
1. working environment temperature: −40° C.~40° C.;
2. Rated strain of the compensation device: 1.96 kN~26.49 kN, or other rated strain according to special requirements;
3. Elongation quantity of the compensation device: generally 1300 mm, compensation device with elongation quantity of no more then 2000 mm may be manufactured according to special requirements;

4. Strain dispersion (including friction) of the compensation device in the range of the entire drawing and retracting travel should not be greater than 4%;

5. The dispersion between the maximum reading of the strain when the compensation cable of the compensation device is drawn and the minimum reading of the strain when the compensation cable of the compensation device is retracted and the rated strain should not be greater than 4%;

6. The compensation device reacts and rotates freely without blocking and deformation after 2×104 entire travels (being drawn and retracted);

7. Wire-breaking arresting device broken weight load≥58.86 kN; when the wire-breaking arresting device is applied the brake, the maximum movement length of the safe cable≤200 mm;

8. All the antisepsis requirements of the compensation device conform to the prescription of "components antisepsis requirements" of TB/T2073; the use life of the compensation device is longer than 15 years.

Accordingly, the constant strain spring compensation device of the present invention is compact, small in size and weight. It may maintain a certain strain on the overhead contact lines (catenary cables, contact cables, and flexible catenary spans) of electrified railway to reduce the contact loss rate of its pantograph. When the length of the overhead contact lines changes due to heat expands and cold contracts because of the change of seasons and temperature, the constant strain spring compensation device is capable of maintaining the strain, elasticity and height constant and unchanged.

Further detailed description of the embodiments of the present invention will be made with reference of the accompanying drawings. The above and other objects, characteristics and advantages of the present invention will become apparent from the detailed description for a person skilled in the art.

DETAILED DESCRIPTION OF EMBODIMENTS

The constant strain spring compensation device of the present invention will be further described below with reference to the accompanying drawings and embodiments.

Figure 1A:
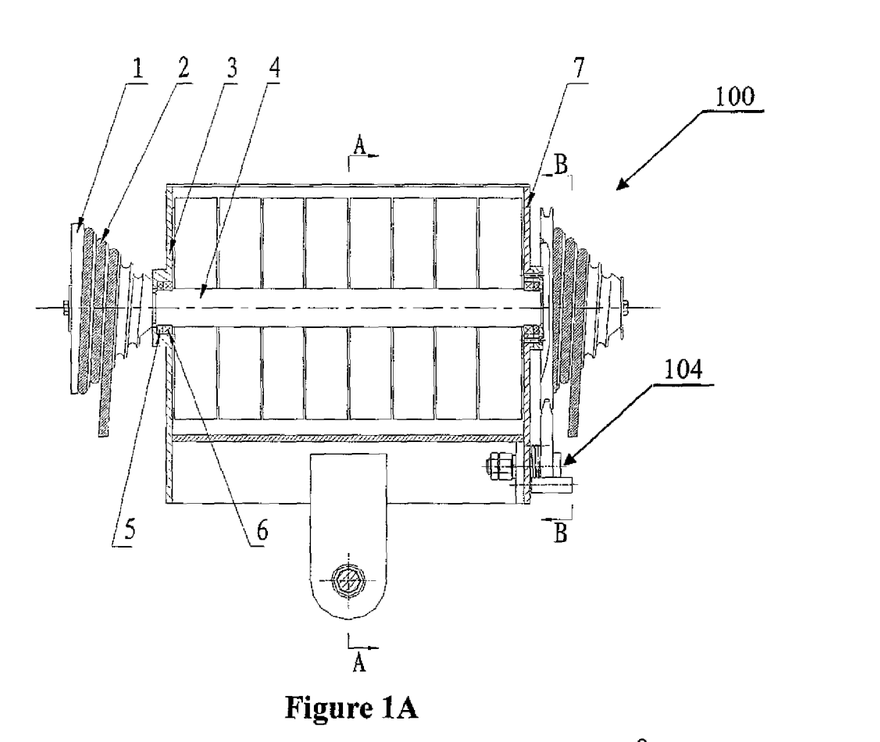
FIG. 1A is a schematic diagram of an example configuration of the constant strain spring compensation device according to the present invention.
Figure 1B:
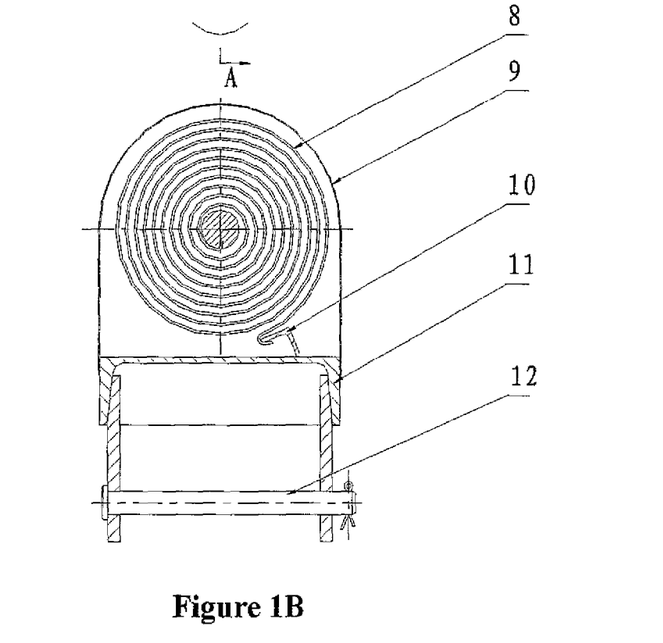
FIG. 1B is a sectional view taken along A-A of FIG. 1A.

The structural diagrams of the constant strain spring compensation device 100 of the present invention are schematically shown in FIGS. 1A and 1B. The constant strain spring compensation device 100 mainly comprises the involute grooved pulley 1, compensation cable 2, left end-plate 3, spindle 4, oil seal 5, bearing 6, right end-plate 7, contact flat spiral spring 8, housing 9, fastening angle steel 10, mounting base 11, pin 12, and wire-breaking arresting device 104, etc.

The contact flat spiral spring 8 in the illustrated embodiment is a variable torque flat spiral spring. The end-radius of the involute grooved pulley can be determined by the following equation: End-radius=Start radius×(End torque of the flat spiral spring/Start torque of the flat spiral spring).

Wherein the left end-plate 3, right end-plate 7, housing 9, fastening angle steel 10, mounting base 11 form a closed box base.

The involute grooved pulley 1 is fixed on both ends of the spindle 4. The compensation cable 2 is wound up, one of the ends of which being fixed onto the grooved pulley 1. The other end is connected to external overhead contact lines. The oil seal 5 on both sides of the box base, the bearing 6, and the spindle 4 are supported on the left end plate 3 and right end plate 7 located at both ends. The contact flat spiral spring 8 is assembled within said box base, of which the inner end hook is connected to a groove of the spindle 4, and the outer end hook is fixed to the fastening angle steel 10.

When the overhead contact lines shrunk upon being cooled by decreasing temperature, the flat spiral spring 8 is released. The compensation cable 2 extended outward along the involute grooved pulley 1 so as to compensate the amount of shrinkage of the overhead contact lines. When the overhead contact lines expanded upon being heated by increasing temperature, the compensation cable 2 is wound up to the involute grooved pulley 1. Therefore, the shortening or elongation of the compensation cable 2 is activated by the torque produced by the tightly winding up and releasing of the flat spiral spring 8, which in turn keeps the overhead contact lines in a horizontal straight line status all the time, ensuring the contact status between the pantograph and the overhead contact lines, guaranteeing the safety in train operation.

In one of the preferred embodiments of the present invention, a wire-breaking arresting device 104 is provided on the right-end plate 7.

Figure 1C:
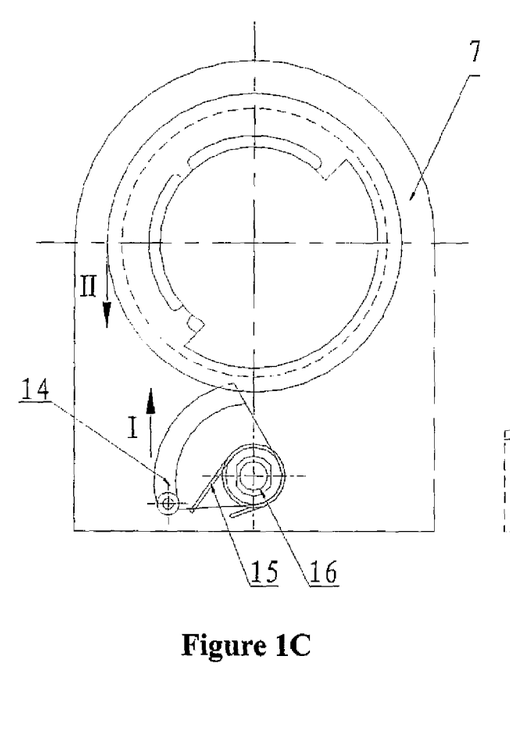
FIG. 1C is a schematic diagram of operation principle of the wire-breaking arresting device in FIG. 1A.
Figure 1D:
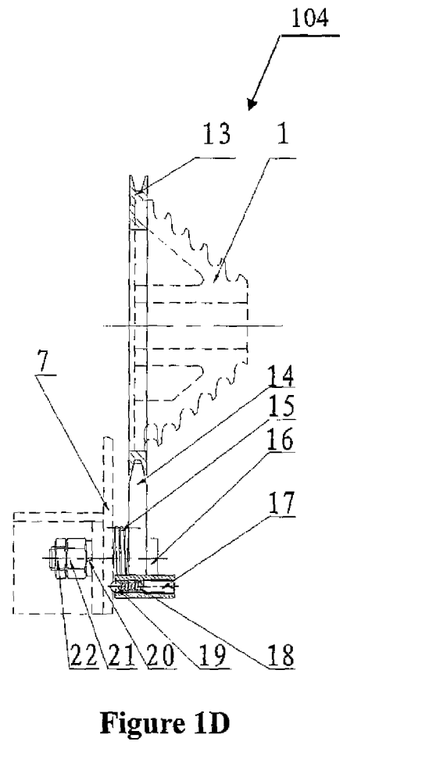
FIG. 1D is a schematic diagram of the configuration of the wire-breaking arresting device in FIG. 1A.

FIG. 1D is a schematic structural diagram of the wire-breaking arresting device 104 of FIG. 1A. Referring to FIG. 1D, said wire-breaking arresting device 104 is formed by the brake disc 13, wedge block 14, torsion spring 15, fastening bolt 16, compression screw 17, compression spring 18, steel ball 19, elastic washer 20, nut 21, and flat nut 22.

Wherein the brake disc 13 is fixed to the involute grooved pulley 1. The wedge block 14 is fixed on the right end-plate by means of the fastening bolt 16. The elastic washer 20, nut 21, and flat nut 22 are fixed on the right end plate. The torsion spring 15 is assembled over the portion of the fastening bolt 16 between the wedge block 14 and the end-plate 7. The groove formed on the outer surface of the brake disc 13 operatively fits and functions with the slit on the top of the wedge block 14. The compression device consisting of said compression screw 17, compression spring 18, and steel ball 19 is installed under the fastening bolt 16. The torsion spring 15 and said compression device may provide support to the wedge block 14.

FIG. 1C is a schematic diagram of the operation principle of the wire-breaking arresting device (viewed from B-B direction) of FIG. 1A. Referring to FIG. 1C, in case of a fault (the breakage of the guide cables of catenary cables, contact cables, and flexible catenary spans, or of the compensation cable 2), the cooperating action between the rebound force produced by the brake disc 13 fixed on the involute grooved pulley 1 and the force of the wedge block 14 (indicated by arrow I in FIG. 1C) forces the slit of the wedge block 14 falling into the groove of the brake disc 13. The rotation of the brake disc 13 and the involute grooved pulley 1 are stopped to the stationary status due to friction, so that the contact flat spiral spring 8 does not produce a relatively large rebound force, ensuring the safe operation of the constant strain spring compensation device 100.

The shape of the connecting bevel surfaces between the brake disc 13 and the wedge block 14 of the wire-breaking arresting device 104 include planes, arc surface, helicoids, spherical surfaces and other curved surfaces, and the combinations thereof. The angle between the tangent planes of any point on said bevel surface and the tangent line at that point through which the circumference with the axis of the revolution as centre goes does not equal to zero.

Figure 2A:
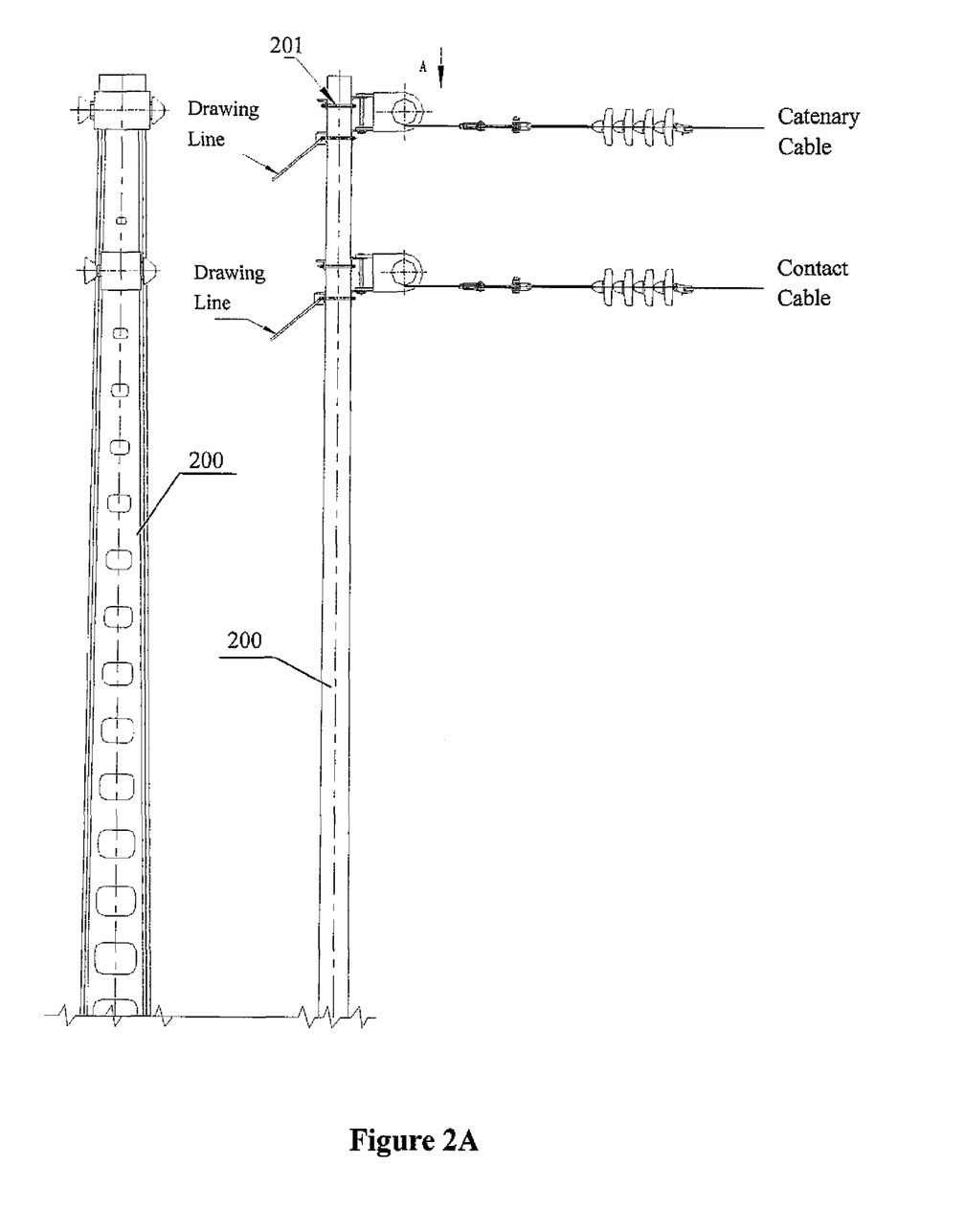
FIGS. 2A and 2B are schematic diagrams of the constant strain spring compensation device according to the present invention mounted on a support.
Figure 2B:
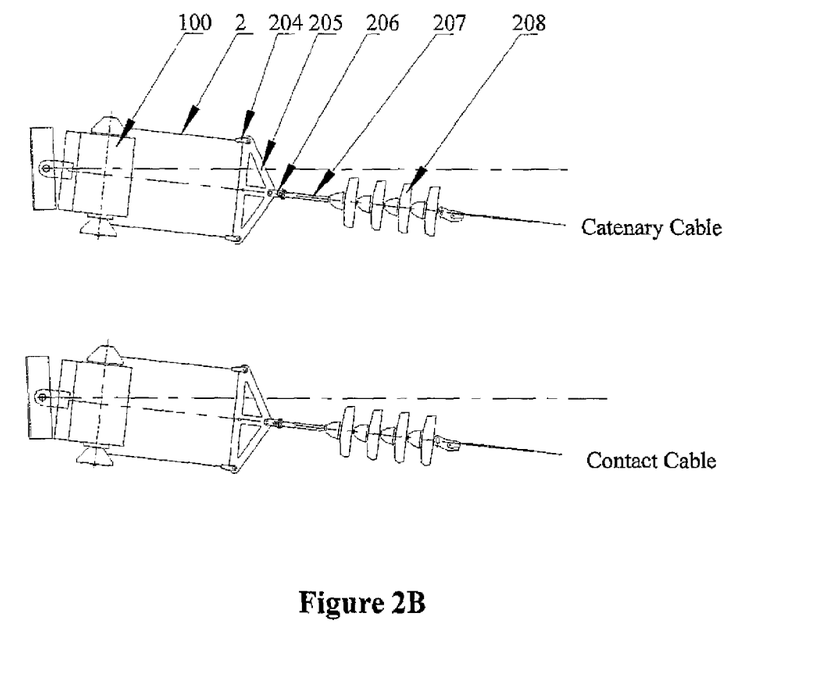

FIGS. 2A and 2B are schematic diagrams of the constant strain spring compensation device 100 according to the present invention mounted on the support 200. The constant strain spring compensation device 100 mainly comprises the support 200, anchoring angle steel 201, constant strain spring compensation device 100, compensation cable 2, double-ear wedge cable clamp 204, balance plate 205, double-ear connector 206, bar link 207, insulation string 208 etc. The constant strain spring compensation device 100 is fixed onto the support 200 by the anchoring angle steel 201. The compensation cable 2 wound on the involute grooved pulley is connected to the catenary cables or the contact cables by the double-ear wedge cable clamp 204, the balance plate 205, the double-ear connector 206, the ball-socket bar 207, and the insulation string 208 etc. Also, drawing lines may be arranged on the support 200 to further ensure the support stands upright and steadily.

Figure 3A:
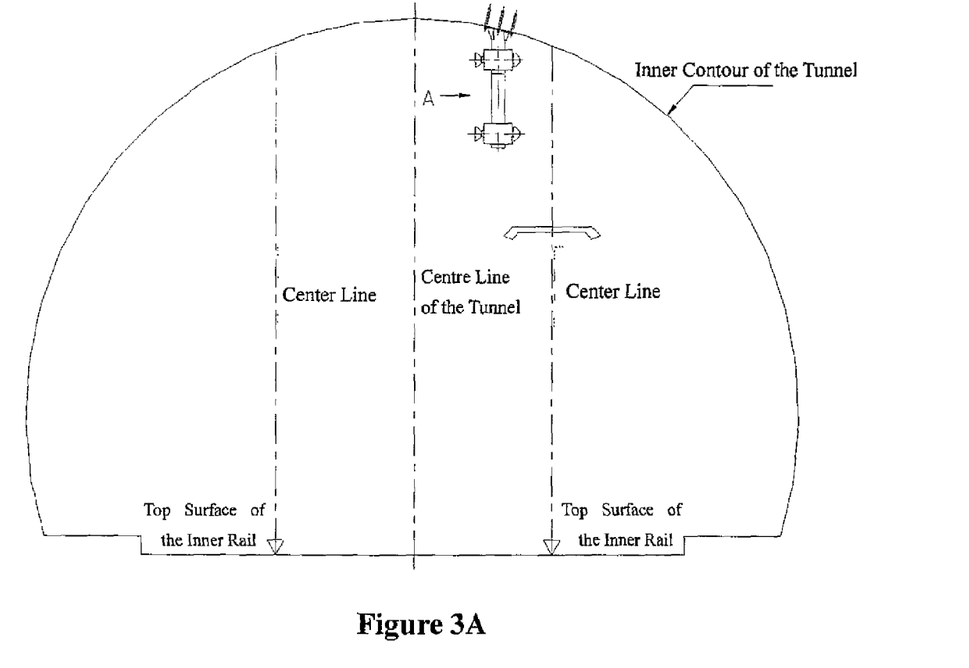
FIGS. 3A-3D are schematic diagrams of the constant strain spring compensation device according to the present invention installed in a tunnel.
Figure 3B:
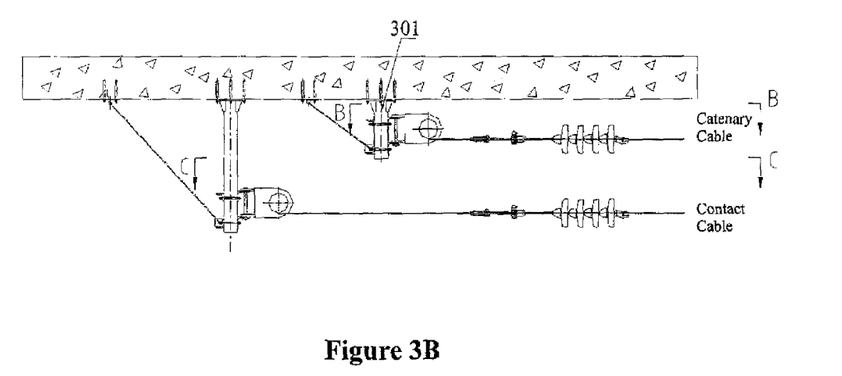

FIGS. 3A-3D are schematic diagrams of the constant strain spring compensation device 100 according to the present invention installed in the tunnel. Wherein FIG. 3B is a schematic diagram viewed along direction of A in FIG. 3A. The constant strain spring compensation device 100 of the present invention is fixed in the tunnel by the anchor arm 301 fixed on the inner top of the tunnel. Also, drawing lines connected to the inner top of the tunnel may be arranged on the anchor arm 301 so as to further ensure the anchor arm 301 to be upright and steady.

Figure 3C:
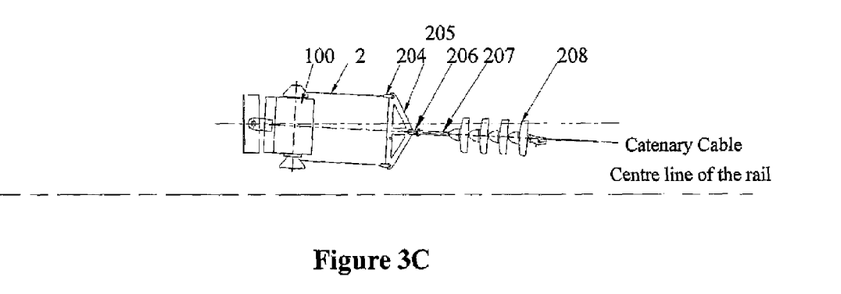

FIG. 3C is a view seen from the direction of B in FIG. 3B. Referring to FIG. 3C, the compensation cable 2 of the constant strain spring compensation device 100 is connected to the catenary cables (or the contact cables) by the double-ear wedge cable clamp 204, balance plate 205, double-ear connector 206, ball-socket bar 207, and insulation string 208 etc.

Figure 3D:
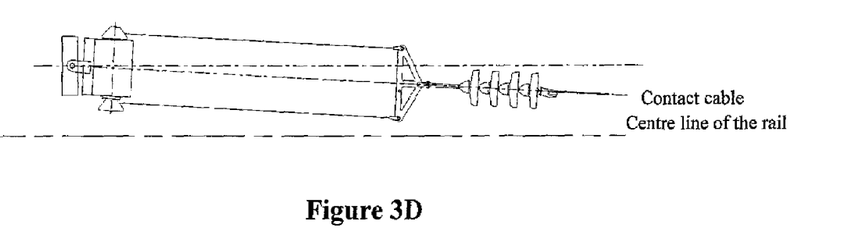

FIG. 3D is a view seen from the direction of C in FIG. 3B, with the configuration shown generally similar to that of FIG. 3C.

Besides the above embodiments, the present invention may have other embodiments. For instance, the contact flat spiral spring may be formed by winding up single-layer steel strip, or may be formed by winding up double-layer or multi-layer steel strip. The contact flat spiral spring may be singular or in plurality, of which the end surface may be linear type, also may be arc type. The involute grooved pulley may be assembled on both sides of the contact flat spiral spring, also may be installed on one side of the contact flat spiral spring. The involute grooved pulley may be substituted by either fixed grooved pulley or helical grooved pulley. The involute grooved pulley may be formed with a single groove or double grooves. The compensation cable may be steel cable, or high performance polyethylene fiber cable. The arresting device may be arranged on one side of the box body, or may be arranged on both sides. Two sets of constant strain spring compensation device with equal strain may be assembled in parallel; also two rows of contact flat spiral springs may be assembled in parallel within one box body and so on and so forth. Any technical solution using equal or equivalent replacement is included in the protection scope of the claims of the present invention.

The invention claimed is:

1. A constant strain spring compensation device, comprising a grooved pulley, a compensation cable, a left end plate, a spindle, an oil seal, a bearing, a right end plate, a contact flat spiral spring, a housing, a fastening angle steel, a mounting base, a pin, and a wire-breaking arresting device;
said grooved pulley being fixed on the spindle, said compensation cable being wound and one of its ends being fixed on the grooved pulley, and the other end being connected to exterior overhead contact lines, said spindle being supported on the left end plate and the right end plate by using the oil seal and bearing;
said left end plate, right end plate, housing, fastening angle steel, and mounting base forming a closed box base, said pin being connected to the side of the mounting base remote from said box base;
said contact flat spiral spring being assembled within said box base, with an inner end hook being connected to the spindle and an outer end hook being connected to the fastening angle steel of the box base;
said wire-breaking arresting device being installed on the left end plate, the right end plate, or a combination thereof, the wire-breaking arresting device being cooperatively assembled with the grooved pulley and the left end plate, right end plate, or a combination thereof in order to stop the grooved pulley to a stationary status by means of friction in the case of breakage of the overhead contact lines or the compensation cable, so that the contact flat spiral spring does not produce a relatively large rebound force, ensuring the safe operation of the constant strain spring compensation device.

2. The constant strain spring compensation device of claim 1, wherein said wire-breaking arresting device includes a brake disc, a wedge block, a torsion spring, a fastening bolt and nut, a compression screw, a compression spring, and a steel ball, wherein the brake disc being fixed to the grooved pulley, the wedge block being fixed on the right end plate by means of the bolt and nut, the torsion spring being assembled over a portion of the fastening bolt between the wedge block and the right end plate, a groove being formed on the outer peripheral surface of the brake disc for operatively fitting and functioning with a slit on the wedge block, a compression device consisting of said compression screw, compression spring, and the steel ball being installed under the fastening bolt.

3. The constant strain spring compensation device of claim 2, wherein, a positioning surface of the spindle is formed with spline slots coupled with a spline housing on the grooved pulley or on a sleeve of the grooved pulley, figures of sections of said spline slots being flanges or grooves.

4. The constant strain spring compensation device of claim 3, wherein, said contact flat spring is a variable torque flat spiral spring or a constant torque flat spiral spring formed by assembling upper and lower groups in parallel.

5. The constant strain spring compensation device of claim 4, wherein, said contact flat spiral spring is one or more than one formed by winding one or more layers of steel strips.

6. The constant strain spring compensation device of claim 5, wherein, said grooved pulley is an involute grooved pulley, a helical grooved pulley, or a fixed grooved pulley, wherein said contact flat spiral spring is a constant torque flat spiral spring when the grooved pulley is said fixed grooved pulley or helical grooved pulley, and wherein said contact flat spiral spring is a variable torque flat spiral spring when the grooved pulley is said involute grooved pulley.

7. The constant strain spring compensation device of claim 6, wherein, said grooved pulley is formed with a single groove or double grooves.

8. The constant strain spring compensation device of claim 7, wherein, said grooved pulley is one installed on one end of the spindle of the box base or on the spindle center.

9. The constant strain spring compensation device of claim 7, wherein, said grooved pulley includes two grooved pulleys symmetrically installed on both ends of the spindle.

10. The constant strain spring compensation device of claim 1, wherein the shape of connecting bevel surfaces between the brake disc and the wedge block of the wire-breaking arresting device include planes, arc surface, helicoids, spherical surfaces and other curved surfaces, and the combinations thereof, the angle between tangent planes of any point on said bevel surfaces and a tangent line at that point through which the circumference with the axis of the revolution as the center goes does not equal to zero.

11. The constant strain spring compensation device of claim 1, wherein said compensation cable is steel cable or high performance polyethylene fiber rope.

12. A constant strain spring compensation device comprising:
    a spindle;
    a grooved pulley fixed to the spindle;
    a compensation cable fixed at a first end to the grooved pulley and connected at a second end to exterior overhead contact lines;
    a left end plate positioned on one end of the spindle and a right end plate positioned on another end of the spindle, the left end plate and the right end plate being positioned on the spindle using an oil seal and a bearing;
    a closed box based formed by the left end plate, the right end plate, a housing, a fastening angle steel, and a mounting base;
    a pin connected to a side of the mounting base remote from the closed box base;
    a contact flat spiral spring assembled within the closed box base, wherein an inner end hook is connected to the spindle and an outer end hook is connected to the fastening angle steel of the closed box base; and
    a wire-breaking arresting device installed on the left end plate, the right end plate, or a combination thereof, the wire-breaking arresting device being cooperatively assembled with the grooved pulley and the left end plate, right end plate, or a combination thereof in order to stop the grooved pulley in a stationary status using friction if the overhead contact lines or the compensation cable breaks,
    wherein the wire-breaking arresting device includes a brake disc, a wedge block, a torsion spring, a fasting bolt and nut, a compression screw, a compression spring, and a steel ball, and
    wherein the brake disc is fixed to the grooved pulley, the wedge block is fixed on the right end plate using the fastening bolt and nut, the torsion spring is assembled over the fastening bolt between the wedge block and the right end plate,
    wherein a groove is formed on an outer peripheral surface of the brake disc for operatively fitting and functioning with a slit on the top of the wedge block, and
    wherein a compression device, which includes the compression screw, the compression spring, and the steel ball, is installed under the fastening bolt.

13. The constant strain spring compensation device of claim 12, wherein a positioning surface of the spindle is formed with spline slots coupled with a spline housing on the grooved pulley or on a sleeve of the grooved pulley, figures of sections of said spline slots being flanges or grooves.

14. The constant strain spring compensation device of claim 12, wherein said contact flat spring is a variable torque flat spiral spring or a constant torque flat spiral spring formed by assembling upper and lower groups in parallel.

15. The constant strain spring compensation device of claim 12, wherein said contact flat spiral spring is formed by winding one or more layers of steel strips.

16. The constant strain spring compensation device of claim 12, wherein, said grooved pulley is an involute grooved pulley, a helical grooved pulley, or a fixed grooved pulley, wherein said contact flat spiral spring is a constant torque flat spiral spring when the grooved pulley is said fixed grooved pulley or helical grooved pulley, and wherein said contact flat spiral spring is a variable torque flat spiral spring when the grooved pulley is said involute grooved pulley.

17. The constant strain spring compensation device of claim 12, wherein said grooved pulley is formed with a single groove or double grooves.

18. The constant strain spring compensation device of claim 12, wherein, said grooved pulley is one installed on one end of the spindle of the box base or on the spindle center.

19. The constant strain spring compensation device of claim 12, wherein said grooved pulley includes two grooved pulleys symmetrically installed on both ends of the spindle.

* * * * *